(12) United States Patent
Rossi et al.

(10) Patent No.: US 10,437,005 B2
(45) Date of Patent: Oct. 8, 2019

(54) TECHNIQUES FOR REDUCING DISTORTION OF OPTICAL BEAM SHAPING ELEMENTS

(71) Applicant: ams Sensors Singapore Pte. Ltd., Singapore (SG)

(72) Inventors: Markus Rossi, Jona (CH); Stephan Heimgartner, Aarau Rohr (CH)

(73) Assignee: AMS SENSORS SINGAPORE PTE. LTD., Singapore (SG)

(*) Notice: Subject to any disclaimer, the term of this patent is extended or adjusted under 35 U.S.C. 154(b) by 0 days.

(21) Appl. No.: 15/322,884

(22) PCT Filed: Jun. 9, 2015

(86) PCT No.: PCT/SG2015/050148
§ 371 (c)(1),
(2) Date: Dec. 29, 2016

(87) PCT Pub. No.: WO2016/003367
PCT Pub. Date: Jan. 7, 2016

(65) Prior Publication Data
US 2017/0139178 A1 May 18, 2017

Related U.S. Application Data

(60) Provisional application No. 62/020,052, filed on Jul. 2, 2014.

(51) Int. Cl.
*G02B 7/02* (2006.01)
*G02B 3/00* (2006.01)
(Continued)

(52) U.S. Cl.
CPC .............. *G02B 7/028* (2013.01); *G02B 1/041* (2013.01); *G02B 3/0031* (2013.01); *G02B 3/02* (2013.01); *G02B 3/08* (2013.01); *G02B 27/0955* (2013.01)

(58) Field of Classification Search
CPC ........ G02B 7/028; G02B 7/008; G02B 7/021; G02B 7/023; G02B 7/025; G02B 7/026;
(Continued)

(56) References Cited

U.S. PATENT DOCUMENTS 4,679,918 A * 7/1987 Ace ..................... G02C 7/02
351/159.62
4,690,512 A 9/1987 Forsyth
(Continued)

FOREIGN PATENT DOCUMENTS

WO 2003/081313 10/2003

OTHER PUBLICATIONS

International Search Report and Written Opinion, issued by ISA/AU for PCT/SG2015/050148 (dated Oct. 26, 2015).
(Continued)

*Primary Examiner* — Evan P Dzierzynski
*Assistant Examiner* — Sharrief I Broome
(74) *Attorney, Agent, or Firm* — Michael Best & Friedrich LLP

(57) ABSTRACT

According to embodiments of the present invention, an apparatus comprising a beam shaping element (lens) is provided. The apparatus comprises a substrate; a beam shaping element; and an elastic intermediate layer disposed between, and in contact with, the substrate and the beam shaping element, wherein the elastic intermediate layer has a Young's Modulus in a range of 2-600 MPa and a Poisson's ratio in a range of 0.2-0.5. Techniques for reducing thermal distortion of lens are described.

9 Claims, 2 Drawing Sheets

(51) Int. Cl.
*G02B 3/02* (2006.01)
*G02B 3/08* (2006.01)
*G02B 1/04* (2006.01)
*G02B 27/09* (2006.01)

(58) Field of Classification Search
CPC ........ G02B 13/14; G02B 13/16; G02B 21/02;
G02B 21/33; G02B 27/0068; G02B 7/02;
G02B 7/08; G02B 7/181; G02B 7/1815;
G02B 26/06; G02B 6/4206; G02B 6/4267
See application file for complete search history.

(56) References Cited

U.S. PATENT DOCUMENTS

| | | | |
|---|---|---|---|
| 5,444,520 A | 8/1995 | Murano | |
| 6,518,353 B2 | 2/2003 | Border et al. | |
| 8,643,953 B2 | 2/2014 | Rossi et al. | |
| 2003/0119962 A1 | 6/2003 | Border et al. | |
| 2006/0114579 A1* | 6/2006 | Shibuya | G02B 6/4204 359/811 |
| 2008/0112059 A1* | 5/2008 | Choi | G02B 3/14 359/664 |
| 2009/0043384 A1* | 2/2009 | Niwa | A61F 2/1635 623/6.13 |
| 2012/0037943 A1 | 2/2012 | Verschuren et al. | |
| 2012/0281302 A1* | 11/2012 | Penniman | G02B 7/04 359/811 |
| 2016/0033690 A1* | 2/2016 | Henriksen | G02B 1/041 359/666 |
| 2016/0103253 A1* | 4/2016 | Oku | G02B 3/14 359/666 |

OTHER PUBLICATIONS

Chen, J. et al., 'The mechanical properties and toughening mechanisms of an epoxy polymer modified with polysiloxane-based core-shell particles,' Polymer, 2013, vol. 54, pp. 4276-4289.

Cerny, M. et al, 'Properties and performance of polysiloxane-derived ceramic matrix in heat resistant composites reinforced with R-glass or fine ceramic fibres,' Ceramics—Silikaty, 2005, vol. 49, No. 3, pp. 145-152.

Kunnavakkam, "Low-cost, low-loss microlens arrays fabricated by soft-lithography replication process," Applied Physics Letters 82(8):1152-1154 (Feb. 24, 2003).

* cited by examiner

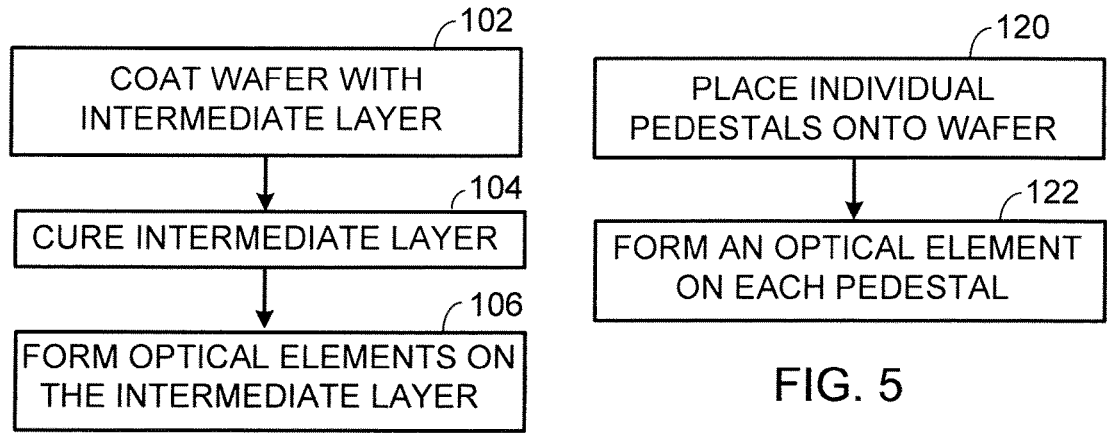
FIG. 4
FIG. 5
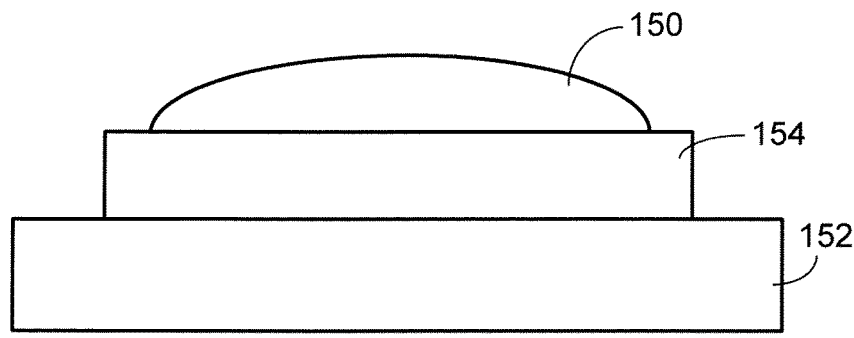
FIG. 6
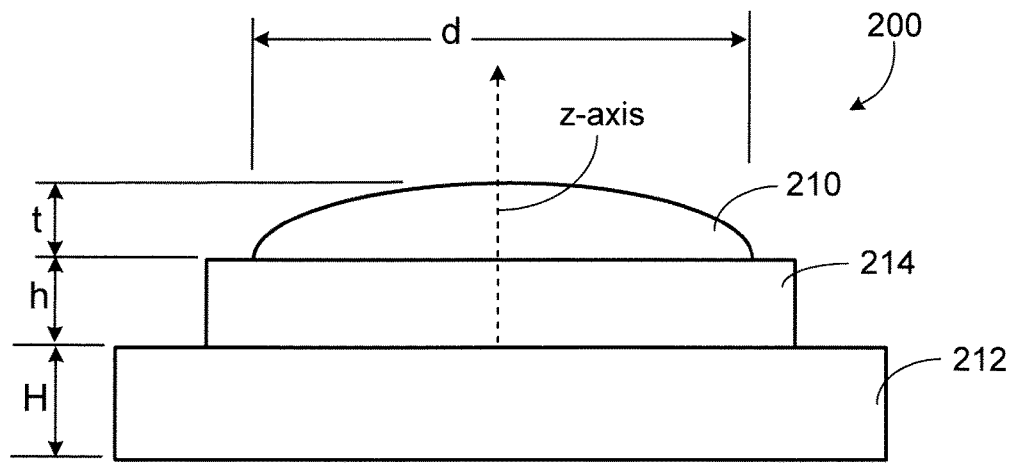
FIG. 7

TECHNIQUES FOR REDUCING DISTORTION OF OPTICAL BEAM SHAPING ELEMENTS

TECHNICAL FIELD

This disclosure relates to reducing distortion of beam shaping elements.

BACKGROUND

Various types of micro optical beam shaping elements are sometimes incorporated into optical or optoelectronic modules such as cameras and other imagers, LED arrays, proximity sensors and other optical sensors. The beam shaping elements (e.g., lenses) often are formed of a plastic material, which can be significantly less expensive than forming the beam shaping elements of glass.

Some applications require environmentally stable materials with good optical properties that can be formed on mechanically rigid substrates. Individual lenses or lens arrays, for example, sometimes are formed or bonded directly on a substrate that has a lower coefficient of thermal expansion (CTE) than the plastic lenses. Consequently, the lens is mechanically constrained at the interface with the substrate. At elevated temperatures, this mechanical constraint and the difference in CTE between the two materials can give rise to deleterious shear stresses in the higher-CTE plastic lens. These shear stresses engender significant dimensional distortions in the plastic lens resulting in a loss or severe degradation of optical function. For example, during operation, the temperature of an optoelectronic module (comprising a high-CTE lens bonded directly to a low-CTE substrate) may increase, sometimes significantly. At elevated temperatures the mechanical constraint combined with the different CTE would distort the plastic lens. For example, a dimensional change in the lens in the direction of the optical axis (i.e., in the direction perpendicular to the surface of the substrate to which the lens is attached) can be relatively large and, consequently, the lens focal length can change significantly as a function of temperature. The resulting optical effect or image can become degraded or distorted.

SUMMARY

The present disclosure describes various techniques and arrangements that, in some cases, can help reduce or alleviate the foregoing problems even when the beam shaping elements have a different CTE from the underlying substrate.

For example, in one aspect, an apparatus includes a substrate, a beam shaping element, and an elastic intermediate layer disposed between, and in contact with, the substrate and the beam shaping element. The elastic intermediate layer has a Young's Modulus in a range of 2-600 MPa and a Poisson's ratio in a range of 0.2-0.5, and in some cases a ratio in a range of 0.3-0.5. In some implementations, the elastic intermediate layer has a linear CTE in a range of 30 to 400 E−6/K at room temperature. Further, in some implementations, the elastic intermediate layer has a thickness such that, in combination, the Young's modulus, the Poisson's ratio, the linear CTE and the thickness remove the mechanical constraint at the interface minimizing deformation of the lens. Thus, the substrate, beam shaping element and elastic intermediate layer can form a stack having an optical axis, such that the elastic intermediate layer reduces thermally induced distortions of the beam shaping element that would otherwise occur at an elevated temperature in the absence of the elastic intermediate layer.

According to another aspect, An apparatus includes a substrate and a beam shaping element. The beam shaping element has a base layer composed of the same material as the beam shaping element, and the base layer is supported by the substrate and disposed between the substrate and the beam shaping element. The thickness of the beam shaping element is in a range of 20-200 μm and the thickness of the base layer is in a range of 50-300 μm. In some implementations, the base layer is a pedestal having a shape corresponding to the shape of the beam shaping element. In some instances, the footprint of the base layer is larger than a footprint of the beam shaping element.

Other aspects, features and advantages will be readily apparent from the following detailed description, the accompanying drawings and the claims.

BRIEF DESCRIPTION OF THE DRAWINGS

FIG. 4 is a flow chart showing an example of providing a PDMS layer.

FIG. 5 is a flow chart showing another example of providing a PDMS layer.

FIG. 6 illustrates another example of an assembly that includes a beam shaping element.

FIG. 7 illustrates example of a further assembly that includes a beam shaping element

DETAILED DESCRIPTION

Figure 1A:
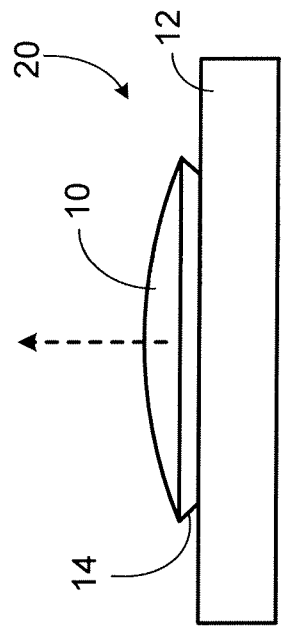
FIG. 1A illustrates an example of an assembly that includes a beam shaping element.

As shown in FIG. 1A, in accordance with a first implementation, an assembly 20 includes a beam shaping element (e.g., a lens) 10 that is decoupled mechanically from an underlying substrate 12 by an intermediate layer 14 composed, for example, of polydimethlysiloxane (PDMS) or a flexible epoxy or acrylate. The assembly thus forms a stack including the beam shaping element 10, the intermediate layer 14 and the substrate 12, where the intermediate layer 14 is disposed between the substrate 12 and the beam shaping element 10. The intermediate layer 14 should be highly elastic (e.g., Young's Modulus=2-600 MPa), should have a Poisson's ratio in the range of 0.2-0.5 (and preferably in the range of 0.3-0.5), should possess a linear CTE of 30 to 400E−6/K at room temperature, and should have a thickness such that the combined features effectively eliminate or reduce the mechanical constraint at the lens-intermediate layer interface—diminishing shear stress at the lens-intermediate layer interface—with reduced or eliminated distortion. Preferably, the intermediate layer 14 is present below the entirety of the beam shaping element 10 so that it supports, and is in contact with, the entire lower surface of the beam shaping element 10 that faces the substrate 12.

Figure 2:
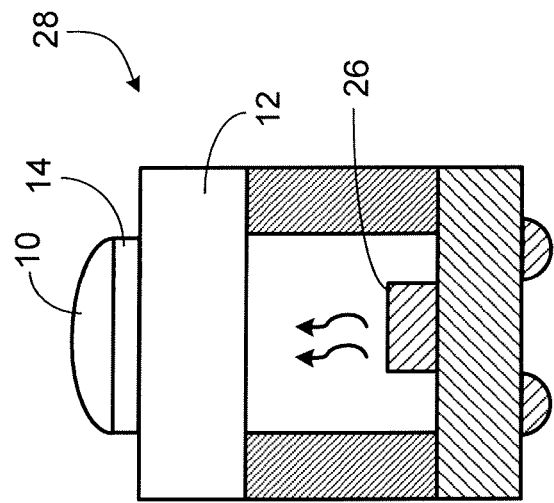
FIG. 2 is an example of an optoelectronic module.
Figure 3:
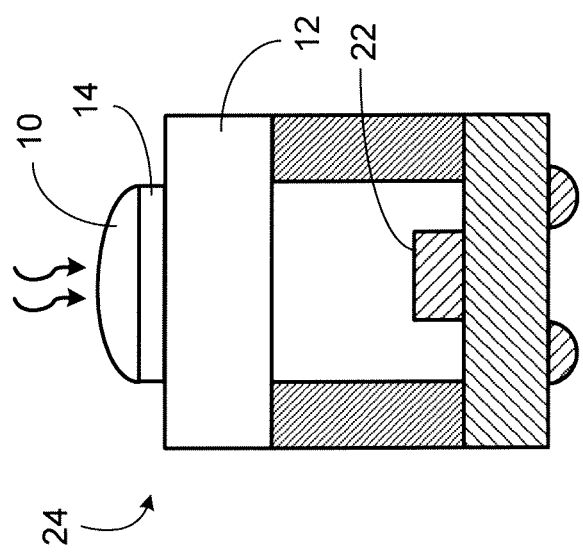
FIG. 3 is another example of an optoelectronic module.

A light beam that passes through the beam shaping element 10 may be shaped in a predefined manner For example, in some implementations, the beam shaping element 10 may focus the light beam toward a light sensitive element 22 in an optoelectronic module 24 (see FIG. 2) or may direct light emitted by a light emitting element 26 out of an optoelectronic module 28 (see FIG. 3). Examples of beam shaping elements that can be used include optical lenses, optical prisms and optical diffraction gratings.

To allow the light that passes through the beam shaping element 10 to pass through the substrate 12 and the intermediate layer 14 as well, the substrate 12 should be composed of a material that is substantially transparent to light at the particular wavelength(s) of interest (e.g., infra-red (IR) or visible). In some implementations, the substrate 12 is composed of glass or other transparent inorganic materials, or of an organic plastic material.

Figure 1B:
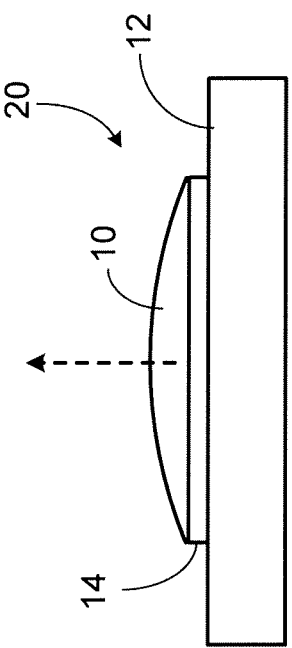
FIG. 1B illustrates another example of an assembly that includes a beam shaping element.

By providing the intermediate layer 14 between the beam shaping element 10 and the substrate 12, even if the assembly 20 is placed in an environment that is at an elevated temperature, any resulting thermally induced distortion (e.g., expansion in the direction perpendicular to the surface of the substrate 12) can be significantly reduced, as the base of the optical element 10 is less rigidly constrained, as shown in FIG. 1B. In particular, the elastic material diminishes the lateral restraint on expansion at the intermediate layer-lens interface.

Various techniques can be used to provide the intermediate layer. Some implementations use a wafer-level process in which a glass or other wafer is coated with an intermediate (PDMS-type) material (FIG. 4, block 102), which then is cured (block 104). In this context, a wafer refers generally to a substantially disk- or plate-like shaped item, its extension in one direction (z-direction or vertical direction) is small with respect to its extension in the other two directions (x- and y-, or lateral directions). In some implementations, the diameter of the wafer is between 5 cm and 40 cm, and can be, for example, between 10 cm and 31 cm. The wafer may be cylindrical with a diameter, for example, of 2, 4, 6, 8, or 12 inches, one inch being about 2.54 cm. In some implementations of a wafer level process, there can be provisions for at least ten modules in each lateral direction, and in some cases at least thirty or even fifty or more modules in each lateral direction.

After depositing the intermediate layer on the wafer, multiple beam optical shaping elements (e.g., lenses) can be formed, for example, by replication, on the intermediate layer (block 106). Replication generally refers to techniques by means of which a given structure or a negative thereof is reproduced (e.g., etching, embossing, or molding).

In other implementations, the elastic intermediate layer can be provided by forming individual pedestals and then placing them (e.g., using pick-and-place equipment) onto a glass or other wafer (FIG. 5, block 120). An optical beam shaping element subsequently can be formed on each of the pedestals, for example, by a replication process (block 122).

The results of the processes of FIG. 4 and FIG. 5 are optics wafers that include multiple beam shaping elements, such as lenses, formed on individual pedestals each of which separates one of the lenses from the underlying wafer. An example is illustrated in FIG. 6, which shows a beam shaping element (e.g., a lens) 150 on a pedestal 154, which in turn is on a transparent substrate 152. In this example, the beam shaping element 150 and pedestal 154 are composed of different materials. The beam shaping elements may be arranged, for example, as an array. The optics wafer then can be used, for example, in a wafer-level process for fabricating multiple optoelectronic modules, such as those illustrated in FIGS. 2 and 3.

FIG. 7 illustrates another implementation of an assembly 200 that includes a beam shaping element (e.g., a lens) 210 formed on a substrate 212. In this example, the beam shaping element 210 includes a relatively thick base layer 214 that can be composed of the same material (e.g., a particular plastic material) as the beam shaping element itself. The base layer 214, in some cases, is a cylindrical or other shaped pedestal. Thus, the base layer 214 can be a pedestal having a shape corresponding generally to the shape of the beam shaping element 210. At elevated temperatures, the thicker base layer 214 may be subject to shear stress at the interface with the lower-CTE substrate; however, the resulting deformations decrease/dissipate with the height of the base layer such that the shape of 210 is not significantly deformed. The thickness of the base layer 214 can depend on various factors, including, for example, the CTE, Poisson's ratio, and modulus of elasticity of the material of the beam shaping element 210 and the base layer 214. In an illustrative example, the lens 210 has a diameter (d) in the range of 750-1000 µm and a thickness (t) of about 150 µm. The thickness (h) of the base layer 214 in the illustrated example is on the order of about 200 µm, and the height (H) of the substrate 212 is in the range of 300-500 µm. In some implementations, the thickness (t) of the lens 210 is in the range of 20-200 µm, and the thickness (h) of the base layer 214 is in the range of 50-300 µm. The footprint of the base layer 214 preferably is somewhat larger than the footprint of the lens 210. Different dimensions may be appropriate for other implementations.

In some implementations, the base layer 214 can be made as part of the same processing step(s) as the beam shaping element 210 itself, whereas in other implementations, the base layer 214 may be formed in separate step(s).

Various techniques can be used to provide the base layer 214 and beam shaping element 210 of FIG. 7. In a first technique, both the base 214 and the beam shaping element 210 are formed as part of the same replication process. For example, the pedestal shape of the base 214 can be incorporated into a single point diamond turn (SDPT) master tool used for wafer-level replication of the combined base 214 and beam shaping element 210. In accordance with a second technique, the beam shaping element and pedestal-shaped base pairs are formed by vacuum injection molding in a wafer-level process. The wafer-level injection molding tool can include channels for receiving injectable material that forms the beam shaping elements and corresponding pedestal-shaped bases. Alternatively, in accordance with a third technique, the pedestal-shaped bases 214 alone can be made by vacuum-injection, and the beam shaping elements (manufactured by the same or other process) can be added in a subsequent step, again as part of a wafer-level process. In some implementations, instead of a wafer-level process, single or multiple beam shaping elements 210 with corresponding pedestal-shaped bases 214 are made by injection molding. In yet other implementations, pedestal-shaped bases 214 are made by a photolithographic process, and then combined with the beam shaping elements 210.

The beam shaping elements in each of the foregoing implementations can be, for example, diffractive, refractive or reflective lenses. They can have concave, convex, or other shapes depending on the desired beam shaping. The beam shaping elements can be composed, for example, of a plastic or composite material.

Various modifications can be made within the spirit of the disclosure. Accordingly, other implementations are within the scope of the claims.

What is claimed is:
1. An apparatus comprising:
a solid substrate;
a solid lens; and an elastic intermediate layer disposed between, and in direct contact with, the substrate and the lens, wherein the elastic intermediate layer has a Young's Modulus in a range of 2 - 600MPa and a Poisson's ratio in a range of 0.2 - 0.5, wherein the solid substrate, the lens and the elastic intermediate layer form a stack having an optical axis that passes through each of the substrate, the lens and the intermediate layer.

2. The apparatus of claim 1 wherein the elastic intermediate layer has a Poisson's ratio in a range of 0.3 - 0.5.

3. The apparatus of claim 1 wherein the elastic intermediate layer has a linear CTE in a range of 30 to 400 E-6/K at room temperature.

4. The apparatus of claim 1 wherein the elastic intermediate layer is in contact with an entire surface of the lens that faces the substrate.

5. The apparatus of claim 1 wherein the lens is replicated onto a surface of the elastic intermediate layer.

6. The apparatus of claim 1 wherein the lens is composed of a plastic material.

7. The apparatus of claim 1 wherein the substrate is composed of a glass or plastic material.

8. An optoelectronic module comprising:
a light sensitive element; and
an optical assembly disposed so as to focus light toward the light sensitive element, wherein the optical assembly includes:
a solid substrate;
a solid lens; and
an elastic intermediate layer disposed between, and in direct contact with, the substrate and the lens, wherein the elastic intermediate layer has a Young's Modulus in a range of 2 - 600 MPa and a Poisson's ratio in a range of 0.2 - 0.5, wherein the solid substrate, the lens and the elastic intermediate layer form a stack having an optical axis that passes through each of the substrate, the lens and the intermediate layer.

9. An optoelectronic module comprising:
a light emitting element; and
an optical assembly disposed so as to direct light emitted by the light emitting element out of the module, wherein the optical assembly includes:
a solid substrate;
a solid lens; and
an elastic intermediate layer disposed between, and in direct contact with, the substrate and the lens, wherein the elastic intermediate layer has a Young's Modulus in a range of 2 - 600 MPa and a Poisson's ratio in a range of 0.2 - 0.5, wherein the solid substrate, the lens and the elastic intermediate layer form a stack having an optical axis that passes through each of the substrate, the lens and the intermediate layer.

* * * * *